(12) United States Patent
Kinoshita et al.

(10) Patent No.: US 6,497,247 B1
(45) Date of Patent: Dec. 24, 2002

(54) PRESSURE VALVE

(75) Inventors: Makoto Kinoshita, Saitama (JP); Kiyotaka Ogata, Saitama (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,754

(22) PCT Filed: Jul. 1, 1999

(86) PCT No.: PCT/DE99/01921
§ 371 (c)(1), (2), (4) Date: Jul. 7, 2000

(87) PCT Pub. No.: WO00/01937
PCT Pub. Date: Jan. 13, 2000

(30) Foreign Application Priority Data

Jul. 2, 1998 (DE) ................................ 298 11 791 U

(51) Int. Cl.[7] ......................... F02M 59/46; F16K 17/18
(52) U.S. Cl. .................... 137/493.9; 123/467; 123/506; 123/510; 285/305
(58) Field of Search .................. 137/493.3, 493.6, 137/493.9; 123/467, 506, 510; 285/314, 315, 321, 305; 251/149.5, 149.6, 297, 366, 367

(56) References Cited

U.S. PATENT DOCUMENTS

| | | | | |
|---|---|---|---|---|
| 2,955,613 A | * | 10/1960 | Block | 137/493.9 |
| 4,467,767 A | * | 8/1984 | Kampichler et al. | 123/467 |
| 4,580,816 A | * | 4/1986 | Campbell et al. | 285/321 |
| 4,926,902 A | * | 5/1990 | Nakamura et al. | 137/493.3 |
| 5,293,897 A | * | 3/1994 | Warga et al. | 137/493.3 |
| 5,778,925 A | * | 7/1998 | Cooke | 137/493.6 |
| 5,950,669 A | * | 9/1999 | Fehlmann et al. | 137/493.3 |
| 6,196,201 B1 | * | 3/2001 | Fehlmann et al. | 137/493.3 |

FOREIGN PATENT DOCUMENTS

| | | | |
|---|---|---|---|
| EP | 0386381 | * | 9/1990 |
| JP | 61-113874 | * | 6/1986 |

* cited by examiner

Primary Examiner—George L. Walton
(74) Attorney, Agent, or Firm—Ronald E. Greigg

(57) ABSTRACT

A pressure valve having a valve body inserted into a bore of a valve housing. The valve body on one end that has plunged into the valve housing has a valve seat face in contact with a movable valve member which can be seated by a restoring force and which is adjoined by a through conduit. The movable valve member penetrates the valve body, for the sake of simpler axial securing of the valve body in the valve housing and also for easier dismantling, the valve body is secured axially in the valve housing via a detent connection.

18 Claims, 2 Drawing Sheets

PRESSURE VALVE

PRIOR ART

The invention is based on a pressure valve for controlling fluid flow to a fuel injection valve. One such pressure valve, known from an earlier German Patent Application, DE 197 10 891.1, is inserted there into a feed line between a pump work chamber of a fuel injection pump and an injection site of the internal combustion engine to be supplied. This known pressure valve, acting as an equal—pressure valve, has a cylindrical valve housing, in which an axial through bore embodied as a stepped bore is provided. A cylindrical valve body embodied as a tubular stub is inserted from the first face end into the stepped bore in the valve housing. The stepped bore has an axial through conduit, and with an end face protruding into the valve housing, The stepped bore forms a valve seat surrounding the through conduit. An axially displaceable valve member, with a sealing face, comes into contact with this valve seat face by the force of a restoring spring. The movable valve member then protrudes into the through conduit of the valve body and, with an end face that has plunged into the valve body, the end face forms a valve seat face for a further valve member, opening in the opposite direction from the first valve member, of a reverse-flow valve disposed inside the valve body.

The cylindrical valve body, in the known pressure valve, is press-fitted via its radial circumferential surface into the through bore in the valve housing. This press-fit connection, however, has the disadvantage that the surfaces of the valve body and of the through bore in the valve housing must be machined very precisely, which entails very major production effort and expense with respect to the tolerance at these fitting faces. Furthermore, a valve body press-fitted into the valve housing in this way is very difficult to dismantle later, so that replacing the pressure valve components for repair purposes later on can be accomplished only at relatively major effort and expense. As an alternative to this, it is known in pressure valves for the valve body to be screwed into the valve housing by means of a thread. This screw connection, however, is also relatively complicated from a production standpoint and moreover weakens the high-pressure strength of the components. The known pressure valves thus have the disadvantage that axially securing the valve body and the valve housing against unintended slipping out can be achieved only at relatively major effort and expense in production, or at the cost of poor dismantling capability.

ADVANTAGES OF THE INVENTION

The pressure valve according to the invention has the advantage over the prior art that axially securing the valve body in the valve housing can be achieved very simply from a production standpoint, and furthermore assures easy dismantling of the two components. To that end, the valve body is advantageously secured axially in the valve housing by means of a detent connection. This detent connection is formed, in a manner similar to a tongue-and-groove connection, by means of an annular collar protruding radially from the circumferential wall of the cylindrical valve body and a receiving annular groove in the wall of the bore of the valve housing. The receiving annular groove is spaced apart in the bore wall of the valve housing from the axial end face toward the valve body, and this intermediate region of the bore has a diameter that is less than the outside diameter of the annular collar, acting as a pressure collar on the valve body. On the opposite side, the receiving annular groove of the valve housing bore is adjoined by a further bore portion, whose diameter is again less than the diameter of the annular collar on the valve body; the two bore portions adjoining the receiving annular groove of the valve housing bore preferably have the same inside diameter. The annular collar on the valve body is also spaced apart from the end faces of the valve body by two shaft regions whose diameter is less than the diameter of the bore regions of the valve housing bore that adjoin the receiving annular groove on both ends. In addition, on its end remote from the valve housing, the valve body has a head piece of enlarged cross section, which is spaced apart from the annular collar by the smaller-diameter shaft region, and whose diameter is greater than the diameter of the bore in the valve housing and is also greater than the annular collar. The axial length of the receiving annular groove in the valve housing bore is greater than the axial length of the annular collar on the valve body. The receiving annular groove is embodied and disposed such that the head piece on the valve body, when the annular collar protrudes into the receiving annular groove, can be brought into contact with the end face of the valve housing. When the annular collar is protruding into the receiving annular groove, it is furthermore possible, with contact of the annular collar on the end toward the valve body of the receiving annular groove, to establish an axial spacing between the end face of the valve housing and the head piece on the valve body. This disposition and embodiment of the receiving annular groove in cooperation with the annular collar on the valve body provides a secure, sealing contact of the valve body head piece with the end face of the valve housing and an initially easy retraction of the valve body out of the valve housing bore, at least far enough that a puller tool can engage the head piece of the valve body from behind. Because of this improved engagement of a puller tool, the valve body can then simply be pulled out of the valve housing. The sealing between the valve body and the valve housing can advantageously be improved by providing that on the annular end face, toward the valve housing, of the head piece on the valve body, or on its end face that has dipped into the valve housing, a biting edge is provided, which cooperates sealingly with a corresponding counterpart face on the valve housing. The axial sealing force is brought to bear either while the pressure valve is being built into a corresponding component, or by an external, separate component.

Another advantage is attained in that when the valve body is inserted or press-fitted into the bore of the valve housing, the body edges to be overtaken that are located on the annular collar, the receiving annular groove or the end face of the valve housing are chamfered, to prevent canting of or damage to the components in the press-fitting process. Furthermore, even very slight differences in diameter between the faces on the valve body and on the valve housing suffice to assure reliable function.

The pressure valve of the invention, in the exemplary embodiment, is embodied as an equal-pressure valve, and the valve member guided axially displaceably in a through bore in the valve body that forms a through conduit receives a further reverse-flow valve that opens counter to the opening direction of the valve member. The axial ends of the through bore in the valve housing are advantageously embodied as line connections, which can be adjoined for example by a feed line to a fuel injection valve or on the other hand a pump work chamber of a high-pressure fuel pump. The embodiment according to the invention of the axial securing of the valve body inside the valve housing is not, however, limited to this type of equal-pressure valve but instead can be used in all similar valve types, in which a tubular component is to be axially secured in a bore of a second component. Alternatively, a transposition would be possible such that the radially protruding annular collar is provided on the bore wall and the radially inward-oriented receiving annular groove is provided on the valve body to be inserted.

Further advantages and advantageous refinements of the subject of the invention can be learned from the drawing, description and claims.

BRIEF DESCRIPTION OF THE DRAWINGS

One exemplary embodiment of the pressure valve of the invention is shown in the drawing)and will be described in further detail below.

DESCRIPTION OF THE EXEMPLARY EMBODIMENT

Figure 1:
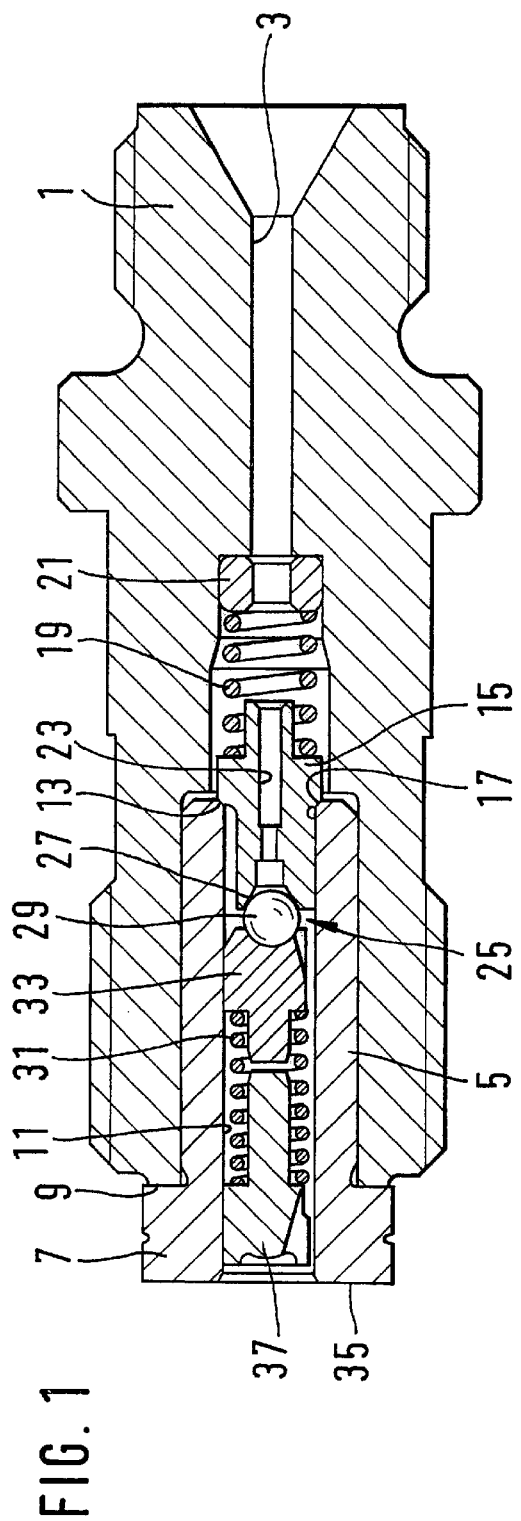
FIG. 1 shows a sectional view of the pressure valve of the invention.
Figure 2:
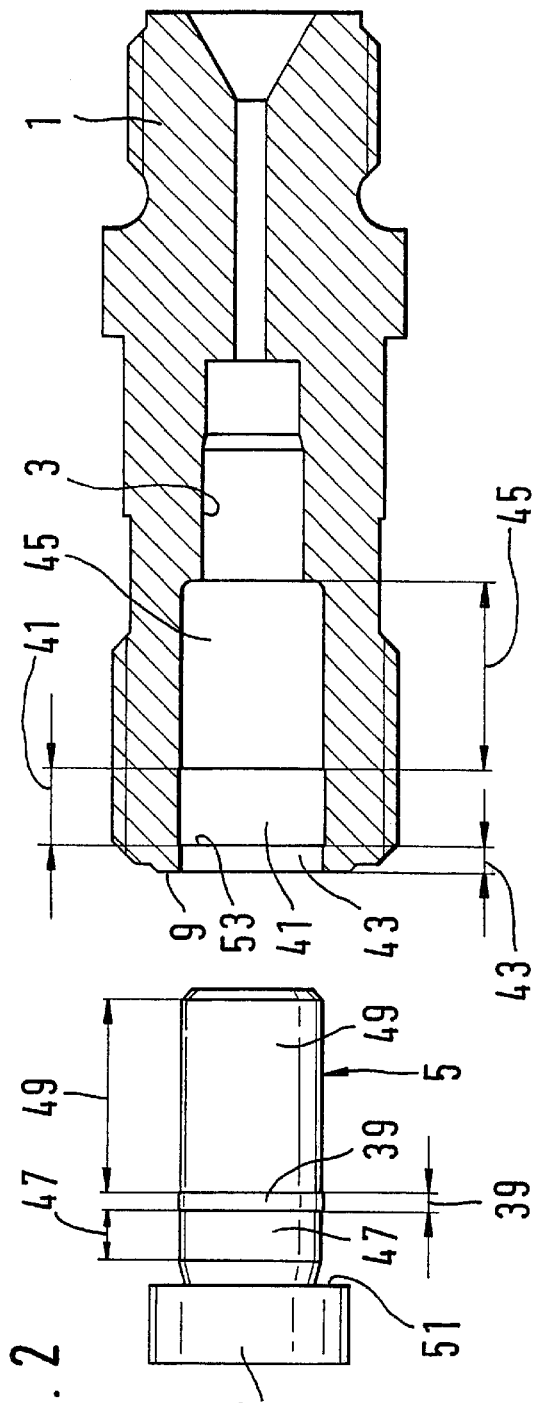
FIGS. 2 through 5 are a simplified illustration of the disposition of the annular collar and receiving annular groove on the valve body and the valve housing, respectively, along with the individual method stages during the insertion of the valve body into the valve housing.

The pressure valve, shown in FIG. 1 in longitudinal section and embodied as an equal-pressure valve, has a valve housing 1, which has a stepped valve member 3 whose axial ends form line connections. A cylindrical valve body 5 is inserted into a portion of enlarged diameter of the through bore 3; in the process, with an enlarged-diameter head piece 7, the valve body 5 comes into contact with an end face 9 toward the valve body of the valve housing 1. The valve body 5 is secured axially against slipping out of the through bore 3 in the valve housing 1; the manner of this axial fixation will be described in further detail in conjunction with FIGS. 2 through 5.

The valve body 5 also has an axial through conduit 11, which at its orifice into the end face that has plunged into the valve housing 1 forms a first valve seat face 13. Cooperating with this preferably conical valve seat face 13 is a piston-like, axially displaceable valve member 15 that has a valve sealing face 17; the movable valve member 15 is guided partly in the through conduit 11. This valve member 15 is kept in contact with the first valve seat 13 by a restoring spring 19, and when the pressure of the medium flaring through exceeds the closing force of this restoring spring 19, the valve member opens in the direction remote from the valve body 5. The restoring spring 19 is braced on its other end solidly against the housing on a bore shoulder of the through bore 3 via an adjusting sleeve 21.

The valve member 15 has an axial through bore 23, which is closable by a reverse-flow valve 25 embodied as a ball valve and opening in the direction of the head piece 7 of the valve body 5. The annular end face of the valve member 15 toward the head piece 7 forms a second valve seat face 27, with which the valve member, embodied as a ball 29, of the reverse-flow valve 25 cooperates. The valve ball 31 of the reverse-flow valve 25 is held in contact with the second valve seat 27 by a valve spring 31 via a spring plate 33; on the other end, the valve spring 31 is supported in stationary fashion relative to the valve body 5. To that end, a stop piece 37 is inserted into the through conduit 11 from its end face 35 that protrudes out of the bore 3 of the valve housing 1; this stop piece forms an abutment for the valve spring 51 and a stroke stop for the spring plate 33.

To assure that the valve body 5 cannot slip unintentionally out of the through bore 3 in the valve housing 1 while at the same time assuring easy dismantling, the valve body 5 is secured, as shown in FIGS. 2 through 5, axially in the through bore 3 of the valve housing 1 by means of a detent connection.

The detent connection is embodied on the order of a tongue-and-groove connection. To that end, first an annular collar 39, protruding radially from the circumferential wall of the cylindrical valve body 5, is provided on the valve body 5. This annular collar 39 cooperates with a receiving annular groove 41 in the wall of the through bore 3 in the valve housing 1. Between the receiving annular groove 41 in the bore wall 3 of the valve housing and the axial end face 9, toward the valve body 5, of the valve housing 1, a bore portion 43 is provided, whose diameter is less than the diameter of the annular collar 39 on the valve body 5. The side remote from this bore portion 43 of the receiving annular groove 41 is also adjoined by a further portion 45 of the through bore 3, whose diameter is again less than the diameter of the annular collar 39 on the valve body 5 and furthermore is preferably embodied as equal in diameter to the bore portion 43.

The annular collar 39 on the valve body 5 is defined on both sides by two shaft regions 47, 49, whose diameters are smaller than the diameter of the bore portions 43 and 45 of the bore 3 adjoining the receiving annular groove 41 on both sides in the valve housing 1. The head piece 7 of enlarged cross section on the valve body 5 is spaced apart from the annular collar 39 by the shaft region 47.

The axial length of the receiving annular groove 41 and the bore portion 43 of the through bore 3 in the valve housing 1 is designed in such a way, as a function of the axial length of the annular collar 39 and the shaft region 47 on the valve body 5, that the valve body 5 locks with axial play, with its annular collar 39 acting as a press-fit collar, into the receiving annular groove 41 of the valve housing 1. This axial play is dimensioned such that it is possible for the valve body 5, when the annular collar 39 is protruding into the receiving annular groove 41, to come into contact with the end face 9 of the valve housing 1 with an annular end face 51 formed at the transition between the head piece 7 and the shaft region 47. On the other hand, the axial play of the annular collar 39 in the receiving annular groove 41, when the annular collar 39 is in contact with a boundary edge 53, toward the end face 9, of the receiving annular groove 41, allows the annular end face 51 of the head piece 7 to lift away from the end face 9 of the valve housing in such a way that a puller tool can engage the head piece 7 of the valve body 5 from behind. For easier introduction of the valve body 5 into the through bore 3 and in particular for easier press-fitting of the annular collar 39 into the bore portion 43, the body edges facing one another that have to be overtaken are preferably chamfered. The bore portion 43 of the through bore 3 of the valve housing 1 that the annular collar 39 has to move past in the process has a slightly lesser size than the diameter of the annular collar 39, and the press-fitting forces are adjustable by way of how these dimensions are set up.

Figure 3:
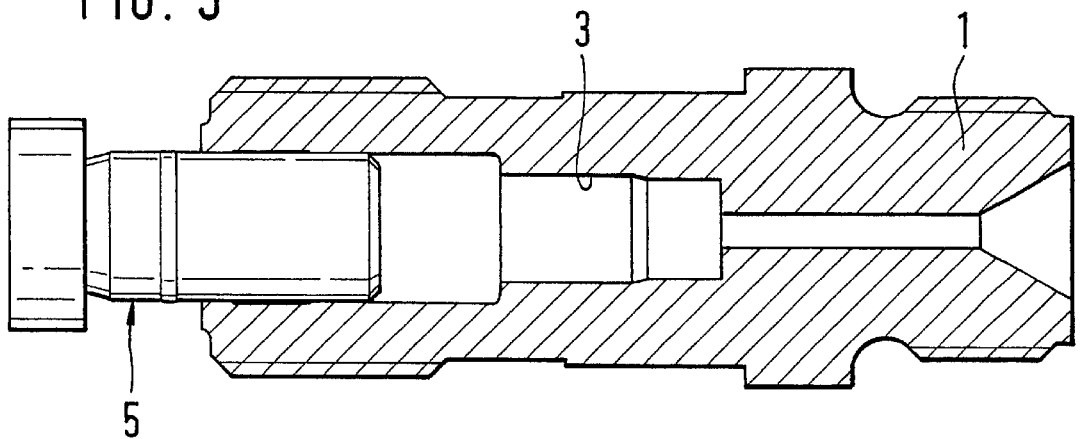
Figure 4:
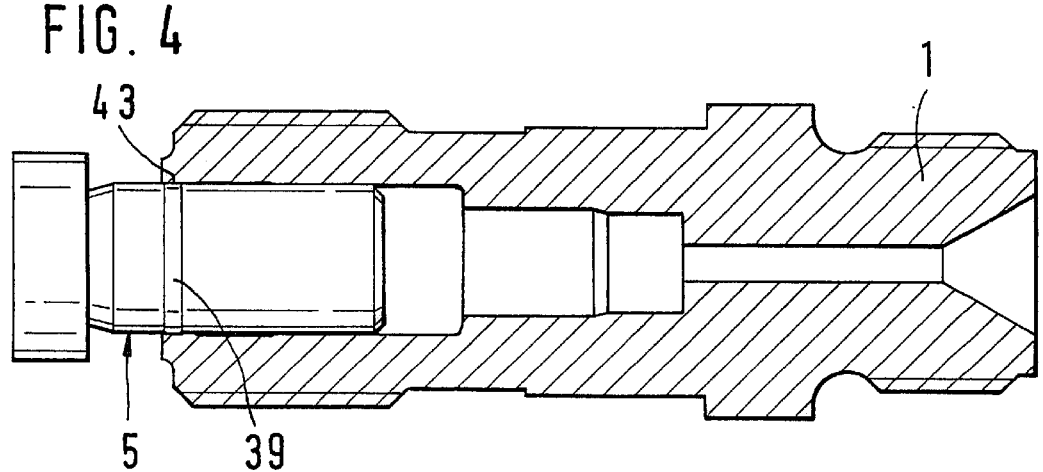
Figure 5:
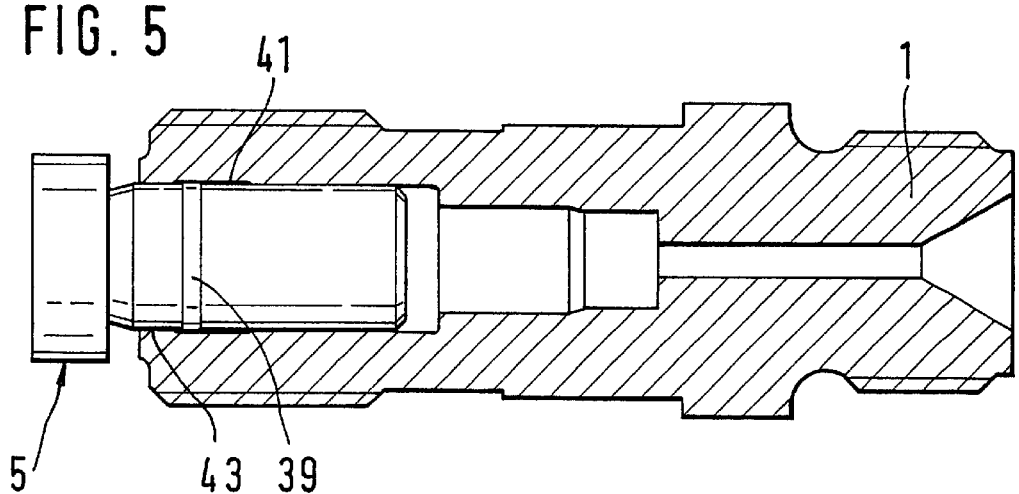

In FIGS. 3 through 5, the operation of inserting or press-fitting the valve body 5 into the through bore 3 of the valve housing 1 is schematically shown.

The valve body 5 in FIG. 3 is first thrust with play, with its shaft region 49, into the through bore 3 until the annular collar 39 contacts the end face 9 of the valve housing. In a further method step, shown in FIG. 4, the valve body 5 is now press-fitted with its annular collar 39 via the bore portion 43 that forms a press fit. After overtaking the bore portion 43 as shown in FIG. 5, the annular collar 39 of the valve body 5 protrudes into or locks in the receiving annular groove 41 and is now guided therein with axial play. This axial securing reliably prevents unintended slipping of the valve body 5 out of the valve housing 1 during shipping or during further assembly of the pressure valve. The valve body 5 reaches its final position once the entire pressure valve is inserted into a suitable housing; the valve body 5 is now displaced by a further component, engaging the head piece 7, into its axial terminal position and held there. In this terminal position, the valve body 5 preferably rests with its head piece 7 on the valve housing 1; sealing off of the valve body 5 from outside is preferably done between the annular end face 51 and the end face 9 of the valve housing. To improve this sealing, these edges can be provided in part with a biting edge, not shown, which deforms plastically when the components are axially braced against one another.

In the event of a possible dismantling of the pressure valve of the invention, the axial play of the valve body 5 in the context of the play of the annular collar 39 inside the receiving annular groove 41 allows the head piece 7 to lift away from the end face 9 of the valve housing, so that a puller tool can be secured easily to the head piece 7 of the tubular valve body 5.

With the pressure valve of the invention, it is thus possible in a way that is simple from both a structural and a production standpoint, to secure the valve body 5 axially against falling out in the through bore 3 of the valve housing 1 and nevertheless to achieve easy dismantling of the valve body 5 from the valve housing 1.

The foregoing relates to a preferred exemplary embodiment of the invention, it being understood that other variants and embodiments thereof are possible within the spirit and scope of the invention, the latter being defined by the appended claims.

I claim:

1. A pressure valve, comprising a valve body (5) for insertion into a bore (3) of a valve housing (1), said valve body, on an end that has been inserted into the valve housing (1), has a valve seat face (13), a movable valve member (15) seats on the valve seat face and is forced onto the valve seat by a restoring spring (19) which is adjoined by a through conduit (11) that penetrates the valve body (5), and the valve body (5) is secured axially in the bore (3) of the valve housing (1) via a detent connection comprised of an annular receiving groove (41) and an annular collar (39), wherein the axial length of the annular receiving groove (41) is greater than the axial length of the annular collar (39), and a head piece (7) on the valve body (5) can be brought into contact with an end face (9) of the valve housing (1) when the annular collar (39) is protruding into the annular receiving groove (41), and when the annular collar (39) is in contact with a boundary edge (53), toward the valve body, of the annular receiving groove (41), the head piece has an axial spacing from the end face (9) of the valve housing (1).

2. The pressure valve according to claim 1, in which the annular collar (39) is integral with and protrudes radially from a circumferential wall of the cylindrical valve body (5) and the annular groove (41) is integral with a wall of the bore (3) of the valve housing (1) and receives the annular collar.

3. The pressure valve according to claim 2, in which between the receiving annular groove (41) in the bore wall (3) of the valve housing (1) and an axial end face (9), toward the valve body, of the valve housing (1), a portion (43) of the bore (3) has a diameter which is less than the diameter of the annular collar 39 on the valve body (5).

4. The pressure valve according to claim 3, in which on the side remote from the end face (9), toward the valve body, of the valve housing (1), a further portion (45) of the bore (3) in the valve housing (1) adjoins the receiving annular groove (41), and a diameter of the further portion (45) is less than the diameter of the annular collar (39) on the valve body (5).

5. The pressure valve according to claim 4, in which one shaft region (47, 49) each adjoins the annular collar (39) in the axial direction of the valve body (5), and a diameter of the shaft region is less than the diameter of the portions (43, 45) of the bore (3) and the valve housing (1) that adjoin the receiving annular groove (41) on each end.

6. The pressure valve according to claim 5, in which the valve body (5), on an end remote from the valve housing (1), has a head piece (7) of enlarged cross section, which is spaced apart from the annular collar (39) by the shaft region (47) of smaller diameter, wherein the diameter of the head piece (7) is greater than the diameter of the bore (3) in the valve housing (1).

7. The pressure valve according to claim 2, in which the edges of he annular collar (39) and/or on the receiving annular groove (41) and/or at an entrance opening of the bore (3) into the valve housing (1) are chamfered so that the valve body (5) can be inserted into the valve housing (1).

8. The pressure valve according to claim 1, in which the movable valve member (15) is axially displaceably guided in a through bore in the valve body (5) that forms a through conduit (11), and that inside the valve member (15), a further reverse-flow valve (25) is disposed which opens counter to an opening direction of the valve member (15).

9. The pressure valve according to claim 1, in which the bore (3) in the valve housing (1) is embodied as an axial stepped through bore, whose axial ends form a line connection.

10. A pressure valve, comprising a valve body (5) for insertion into a cylindrical bore (3) of a valve housing (1), said valve body, on an end that has been inserted into the valve housing (1), has a valve seat face (13), a movable valve member (15) seats on the valve seat face and is forced onto the valve seat by a restoring spring (19) which is adjoined by a through conduit (11) that penetrates the valve body (5), and the valve body (5) is secured axially in the bore (3) of the valve housing (1) via a detent connection, in which the detent connection is formed by an annular collar (39), that protrudes radially from a circumferential wall of the cylindrical valve body (5) and the valve body is secured by an annular groove (41) in a wall of the bore (3) of the valve housing (1) which receives the annular collar.

11. The pressure valve according to claim 10, in which between the receiving annular groove (41) in the bore wall (3) of the valve housing (1) and an axial end face (9), toward the valve body, of the valve housing (1), a portion (43) of the bore (3) has a diameter which is less than the diameter of the annular collar 39 on the valve body (5).

12. The pressure valve according to claim 11, in which on the side remote from the end face (9), toward the valve body, of the valve housing (1), a further portion (45) of the bore (3) in the valve housing (1) adjoins the receiving annular groove (41), and a diameter of the further portion (45) is less than the diameter of the annular collar (39) on the valve body (5).

13. The pressure valve according to claim 12, in which one shaft region (47, 49) each adjoins the annular collar (39) in the axial direction of the valve body (5), and a diameter of the shaft region is less than the diameter of the portions (43, 45) of the bore (3) and the valve housing (1) that adjoin the receiving annular groove (41) on each end.

14. The pressure valve according to claim 13, in which the valve body (5), on an end remote from the valve housing (1), has a head piece (7) of enlarged cross section, which is spaced apart from the annular collar (39) by the shaft region (47) of smaller diameter, wherein the diameter of the head piece (7) is greater than the diameter of the bore (3) in the valve housing (1).

15. The pressure valve according to claim 10, wherein the axial length of the annular receiving groove (41) is greater than the axial length of the annular collar (39), and a head piece (7) on the valve body (5) can be brought into contact with an end face (9) of the valve housing (1) when the annular collar (39) is protruding into the annular receiving groove (41), and when the annular collar (39) is in contact with a boundary edge (53), toward the valve body, of the annular receiving groove (41), the head piece has an axial spacing from the end face (9) of the valve housing (1).

16. The pressure valve according to claim 10, in which the edges of the annular collar (39) and/or on the receiving annular groove (41) and/or at an entrance opening of the bore (3) into the valve housing (1) are chamfered so that the valve body (5) can be inserted into the valve housing (1).

17. The pressure valve according to claim 10, in which the movable valve member (15) is axially displaceably guided in a through bore in the valve body (5) that forms a through conduit (11), and that inside the valve member (15), a further reverse-flow valve (25) is disposed which opens counter to an opening direction of the valve member (15).

18. The pressure valve according to claim 10, in which the bore (3) in the valve housing (1) is embodied as an axial stepped through bore, whose axial ends form a line connection.

* * * * *